US008977495B1

(12) United States Patent  
Hurand et al.

(10) Patent No.: US 8,977,495 B1  
(45) Date of Patent: Mar. 10, 2015

(54) TIME INDEPENDENT TRANSIT ROUTING

(75) Inventors: Mathilde Claire Hurand, Zurich (CH); Veselin Raychev, Zurich (CH)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 13/283,447

(22) Filed: Oct. 27, 2011

(51) Int. Cl.  
*G01C 21/34* (2006.01)

(52) U.S. Cl.  
USPC .......................................... 701/527

(58) Field of Classification Search  
USPC .......................................... 701/527  
See application file for complete search history.

(56) References Cited

U.S. PATENT DOCUMENTS

| 2004/0143560 | A1* | 7/2004 | Zhu ................................ 706/19 |
| 2009/0119001 | A1* | 5/2009 | Moussaeiff et al. ........... 701/200 |
| 2012/0004840 | A1* | 1/2012 | Lee et al. ...................... 701/200 |

OTHER PUBLICATIONS

"Bing Bing Maps Gets Transit Directions—Bing Maps Blog—Site Blogs—Bing Community", <http://www.bing.com/community/site_blogs/b/maps/archive/2010/09/16/bing-maps-gets-transit-directions.aspx> (Sep. 16, 2010).
Delling, Daniel et al., "Engineering Route Planning Algorithms", Algorithmics, LNCS 5515, pp. 117-139 (2009).
"Official Google Blog: Public transit via Google", <http://googleblog.blogspot.com/2005/12/public-transit-via-google.html> (Dec. 7, 2005).
Bajaj, Vikas, "Hopping the Subway? Jump on the Web First", <http://www.nytimes.com/2005/08/01/technology/01hop.html> (Aug. 1, 2005).

\* cited by examiner

*Primary Examiner* — John Q Nguyen  
*Assistant Examiner* — Kyung Kim  
(74) *Attorney, Agent, or Firm* — Dority & Manning, P.A.

(57) ABSTRACT

The subject matter of this specification can be implemented in, among other things, a method that includes receiving information identifying a start point and an end point in a transit system. The method further includes identifying transit routes between the start point and the end point. Each of the transit routes has one or more portions and each of the portions has one or more modes of transportation. The method further includes calculating a duration for each transit route in the transit routes. The duration is based on average amounts of time spent riding the modes of transportation in the portions of the transit route. The duration is based on a representation of an amount of time spent waiting for the modes of transportation in the portions of the transit route. The method further includes identifying one or more of the transit routes as optimal based on having shortest durations.

26 Claims, 4 Drawing Sheets

TIME INDEPENDENT TRANSIT ROUTING

TECHNICAL FIELD

This instant specification relates to transit route planning

BACKGROUND

Many services exist for planning a route using a transit system. Typically, a user inputs a departure and/or arrival time as well as start and destination locations to the transit planning service. The transit service then uses the user inputs and transit schedules to solve the routing problem. The transit service then outputs a set of transit options that can get the user from the starting location to the ending location at the prescribed departure and/or arrival time. Some transit planning services can even plan trips that make use of transit options from separate transit systems, such as a local bus service and a national or regional train service.

SUMMARY

In one aspect, a computer-implemented method for transit route planning includes receiving information that identifies a start point and an end point in a transit system. The method further includes identifying transit routes between the start point and the end point. Each of the transit routes has one or more portions and each of the portions has one or more modes of transportation. The method further includes calculating a duration for each transit route in the transit routes. The duration is representative of an amount of time spent getting from the start point to the end point using the transit route. The duration is based on average amounts of time spent riding the modes of transportation in the portions of the transit route. The duration is based on a representation of an amount of time spent waiting for the modes of transportation in the portions of the transit route. The representation of the amount of time spent waiting is based on numbers of trips that the modes of transportation make for the portions of the transit route. The method further includes identifying one or more of the transit routes as optimal based on having shortest durations.

Implementations can include any, all, or none of the following features. The method can include providing the one or more of the transit routes that are optimal to a computing device for presentation to a user. Identifying the one or more of the transit routes that are optimal can be independent of time within a period of operation of the modes of transportation, and the numbers of trips that the modes of transportation make can be for the period of operation of the modes of transportation. Identifying the one or more of the transit routes that are optimal can further include identifying one or more of the transit routes that have a least number of transfers in addition to having the shortest durations. The representation of the amount of time spent waiting can be further based on an amount of time in the period of operation of the modes of transportation of each portion of each transit route divided by a sum of the numbers of trips for the modes of transportation of the portion. The average amounts of time spent riding the modes of transportation can be a weighted average based on the numbers of trips for the modes of transportation. The duration for each transit route can be further based on an amount of time spent getting to the modes of transportation in the transit route other than while riding the modes of transportation. The method can include, prior to receiving the information that identifies the start point and the end point in the transit system, calculating and storing for each transit route in the transit routes one or more of: the duration of the transit route, the amount of time in the period of operation of the modes of transportation in the portions of the transit route, the numbers of trips that the modes of transportation make for the portions of the transit route, the average amounts of time spent riding the modes of transportation in the portions of the transit route, and the representations of the amount of time spent waiting for the modes of transportation in the portions of the transit route.

In one aspect, a computer-implemented system for transit route planning includes a memory that stores data representing transit routes in a transit system. Each of the transit routes has one or more portions and each of the portions has one or more modes of transportation. The system further includes an interface that receives, from a computing device, data that identifies a start point and an end point in the transit system. The system further includes a route identification module that identifies one or more of the stored transit routes as going from the start point to the end point. The system further includes a route calculation module that calculates a duration for each transit route in the identified transit routes. The duration is representative of an amount of time spent getting from the start point to the end point using the transit route. The duration is based on average amounts of time spent riding the modes of transportation in the portions of the transit route. The duration is based on a representation of an amount of time spent waiting for the modes of transportation in the portions of the transit route. The representation of the amount of time spent waiting is based on numbers of trips that the modes of transportation make for the portions of the transit route. The system further includes a route optimization module that identifies one or more of the identified transit routes as optimal based on having shortest durations.

Implementations can include any, all, or none of the following features. The route optimization module can provide the one or more of the identified transit routes that are optimal to the computing device through the interface. The route optimization module can identify the one or more of the identified transit routes independent of time within a period of operation of the modes of transportation, and the numbers of trips that the modes of transportation make can be for the period of operation of the modes of transportation. The route optimization module can further identify the one or more of the identified transit routes that are optimal based on having a fewest number of transfers. The representation of the amount of time spent waiting can be further based on an amount of time in the period of operation of the modes of transportation of each portion of each transit route divided by a sum of the numbers of trips for the modes of transportation of the portion. The average amounts of time spent riding the modes of transportation can be a weighted average based on the numbers of trips for the modes of transportation. The duration for each transit route can be further based on an amount of time spent getting to the modes of transportation in the transit route other than while riding the modes of transportation. Prior to receiving the information that identifies the start point and the end point in the transit system, the route calculation module can calculate and store for each transit route in the stored transit routes one or more of: the duration of the transit route, the amount of time in the period of operation of the modes of transportation in the portions of the transit route, the numbers of trips that the modes of transportation make for the portions of the transit route, the average amounts of time spent riding the modes of transportation in the portions of the transit route, and the representations of the amount of time spent waiting for the modes of transportation in the portions of the transit route.

The details of one or more implementations are set forth in the accompanying drawings and the description below. Other features and advantages will be apparent from the description and drawings, and from the claims.

DETAILED DESCRIPTION

This document describes systems and techniques for planning a time independent trip or route that uses one or more transit systems. The systems and techniques can, in some implementations, identify a time independent trip or route that represents a typical route one would use from a source to a destination if departure and arrival time are less important or are not a factor. The system collapses or aggregates transit schedule information for connections between a pair of locations in a transit system that can have multiple modes of transportation. In particular, the system collapses or aggregates schedule information for each location pair to estimate an amount of time spent riding transportation during a trip between the location pair for a particular period of operation, such as during business hours for a particular day of the week. The system also collapses or aggregates the schedule information to estimate an amount of time spent waiting for transportation at the location pair during the particular period of operation.

The system can combine the estimated times spent riding and can combine the estimated times spent waiting across multiple paths between the same location pair for multiple modes of transportation. The system can also combine the estimated times spent riding and waiting across entire routes including multiple location pairs. The system uses the combined times spent riding and waiting to calculate a duration for taking a particular transit route from the source to the destination.

The system can then provide one or more transit routes with shortest durations to a user as recommendations for getting from the source to the destination. In some implementations, the recommendations represent a typical or usual route one might take from the source to the destination, such as a route that one might find in a guidebook or a tourist brochure. Alternatively or in addition, the system can provide the transit routes with the smallest duration to a time dependent transit routing system for use in identifying a specific transit route for a particular time of day.

Figure 1:
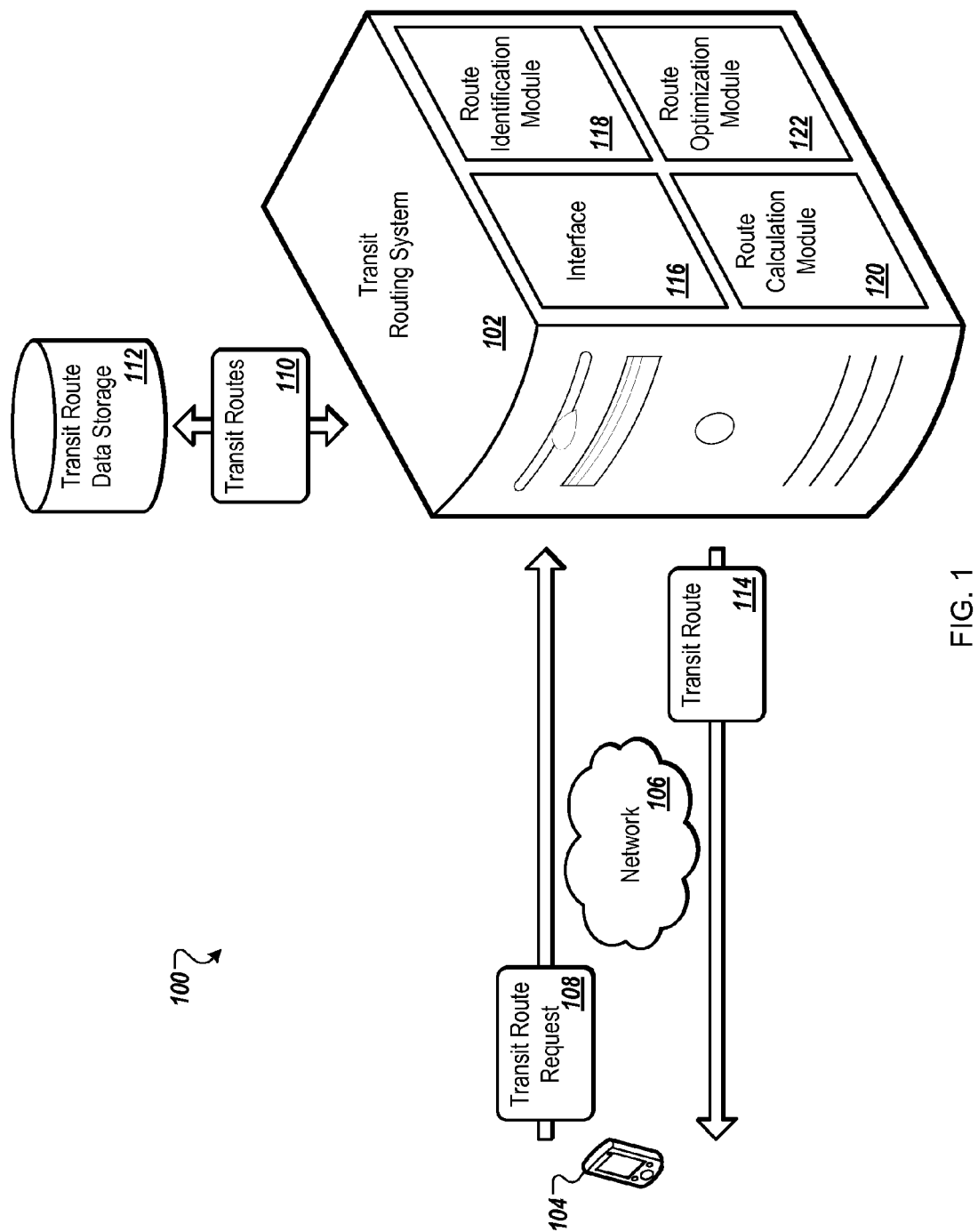
FIG. 1 is a schematic diagram that shows an example of a system for planning a time independent transit route.

FIG. 1 is a schematic diagram that shows an example of a system 100 for planning a time independent transit route. The system 100 includes a transit routing system 102 in communication with a computing device 104 through a network 106. The computing device 104 sends a request 108 to the transit routing system 102 for a transit route from a particular source location to a particular destination location.

In some implementations, the request 108 can be time independent. For example, the user may seek a typical route from the source to the destination irrespective of a specific time of day and/or date. Accordingly, the request 108 may not initially include a specific departure time and/or day, and the request 108 may not initially include a specific arrival time and/or day.

In some implementations, the request 108 can be time dependent. For example, the user may seek a route from the source to the destination at a specific time of day and/or date. The transit routing system 102 receives the request 108 and identifies one or more time independent transit routes for the requested source and destination. The transit routing system 102, or another system, then uses the time independent transit routes to identify a route for the requested specific time and/or date.

In either case, the transit routing system 102 receives the request 108 from the computing device 104. For example, the transit routing system 102 can include an interface 116 for connecting to the network 106 and receiving the request 108. The transit routing system 102 then retrieves data for one or more transit routes 110 from a data storage 112. The transit routes 110 include various paths that a person can take to get from the source location to the destination location. Each transit route can include one or more transfer stations at which the person transfers to another mode of transportation for the subsequent portion or leg of the transit route. In addition, each portion or leg of the transit route can have one or more different modes of transportation and each mode of transportation can make multiple trips from the transfer station to a next transfer station in the transit route.

For example, the transit routing system 102 can include a route identification module 118 that identifies a first possible transit route from the source to the destination. The identified transit route includes walking to a first transfer station. Next, the transit route includes taking a commuter train mode of transportation to a second transfer station. After the commuter rail, the transit router includes walking to either a trolley mode of transportation or a bus mode of transportation and taking the trolley or the bus to a third transfer station. Then, the transit route includes walking from the third transfer station to the final destination.

Each of the modes of transportation has a particular number of trips per some period of operation that may include, for example, a number of days of the week and hours of the day. For example, the period of operation can include business hours (e.g., 8:00 a.m. to 8:00 p.m.) during a work week (e.g., Monday to Friday), or business hours during a week end (e.g., Saturday and Sunday), or extended hours (e.g., 4:00 a.m. to 11:00 p.m.) during a holiday (e.g., a local independence day). The number of trips includes a number of times that the mode of transportation (e.g., a particular bus line or train line) travels from a starting station to an ending station during the period of operation.

The transit routing system 102 includes a route calculation module 120 that calculates a duration for each of the possible transit routes that is independent of a specific time of day. The duration includes an amount of time spent riding the modes of transportation in the transit route as well as an amount of time spent by the person waiting at transfer stations for the modes of transportation to arrive.

In some implementations, the route calculation module 120 calculates the amount of time spent riding for each portion of the transit route as a weighted average of the time spent riding for each mode of transportation that could be used for that portion. For example, in the portion with the option of the trolley and the bus, the trolley may take ten minutes to complete the portion and the trolley may make one hundred trips during business hours per workweek. In addition, the bus may take fifteen minutes to complete the same portion and the bus may make two hundred trips during business hours per workweek. To calculate the weighted average, the time to complete the portion for each mode is multiplied by the number of trips for the mode to calculate weighted times for each mode. Next, the weighted times for each mode that could be used for that portion are summed. Then, the sum is divided by the total number of trips for all of the modes that could be used for that portion. For the trolley and bus portion of the transit route, this results in a weighted average of about thirteen minutes. The route calculation module 120 can calculate the weighted average amount of time spent riding for a portion using the following equation:

$$\text{Time Riding}_{Portion} = \frac{\sum\limits_{\substack{Modes\ in\\Portion}} \text{Time Riding}_{Mode} \times \text{Trips}_{Mode}}{\sum\limits_{\substack{Modes\ in\\Portion}} \text{Trips}_{Mode}} \quad \text{Equation 1}$$

For example, the route calculation module 120 can calculate the weighted average amount of time spent riding the trolley and bus portion using the following equation:

$$\text{Time Riding}_{Trolley\ and\ Bus\ Portion} = \quad \text{Equation 2}$$

$$\frac{10 \times 100 + 15 \times 200}{100 + 200} = 13\frac{1}{3} \text{ minutes}$$

Next, the route calculation module 120 calculates the overall time spent riding for a particular transit route. In some implementations, the overall time spent riding is the sum of the times spent riding for the individual portions of the transit route. For example, if the commuter train has a time spent riding of twenty minutes, then the route calculation module 120 calculates the overall time spent riding for the transit route as about thirty-three minutes. The route calculation module 120 can calculate the overall time spent riding for a transit route using the following equation:

$$\text{Time Riding}_{Route} = \sum\limits_{\substack{Portions\ in\\Route}} \text{Time Riding}_{Portion} \quad \text{Equation 3}$$

For example, the route calculation module 120 can calculate the overall time spent riding for the train, trolley, and bus transit route using the following equation:

$$\text{Time Riding}_{Train,\ Trolley,\ and\ Bus\ Route} = \quad \text{Equation 4}$$

$$20 + 13\frac{1}{3} = 33\frac{1}{3} \text{ minutes}$$

In some implementations, the route calculation module 120 calculates the amount of time spent waiting for transportation for a portion of the transit route as the period of operation for the portion divided by a sum of the numbers of trips for the portion. For example, the route calculation module 120 can calculate the amount of time in minutes for the period of operation that includes business hours during a workweek as five days per week multiplied by twelve hours per day and multiplied by sixty minutes per hour for a total of three thousand six hundred minutes. The route calculation module 120 can add the one hundred trips from the trolley and the two hundred trips from the bus to calculate a sum of three hundred trips for the portion. The route calculation module 120 then divides the amount of time in the period of operation by the sum to calculate an amount of time spent waiting for transportation at the portion of twelve minutes. The route calculation module 120 can calculate the time spent waiting for transportation for a portion using the following equation:

$$\text{Time Waiting}_{Portion} = \frac{\text{Period of Operation}}{\sum\limits_{\substack{Modes\ in\\Portion}} \text{Trips}_{Mode}} \quad \text{Equation 5}$$

For example, the route calculation module 120 can calculate the time spent waiting for transportation for the trolley and bus portion using the following equation:

$$\text{Time Waiting}_{Trolley\ and\ Bus\ Portion} = \frac{5 \times 12 \times 60}{100 + 200} = 12 \text{ minutes} \quad \text{Equation 6}$$

In some implementations, the period of operation can include a different interval than business hours during a workweek. For example, the period of operation can include business hours for one day. Accordingly, the number of trips for each mode of transportation and portion of the transit route would then represent a number of trips during business hours for one day.

In addition, a transit route, a portion of a transit route, and/or a mode of transportation for a portion of a transit route can each have multiple periods of operation. For example, a bus line mode of transportation for a portion of a transit route can have a first period of operation for business hours during a workweek and a second period of operation for business hours during weekends and holidays. In some implementations, the transit routing system 102, or another system, identifies a period of operation by identifying a period of time in which frequencies of trips at times during the period of time for the route, portion, and/or mode are the same or within some threshold range of frequencies.

The route calculation module 120 then uses the period of operation and the numbers of trips for each mode of transportation for a portion to calculate the time spent waiting for transportation at the portion. Next, the route calculation module 120 calculates the overall time spent waiting for transportation for a particular transit route. In some implementations, the overall time spent waiting is the sum of the times spent waiting for the individual portions of the transit route. For example, if the commuter train has a time spent waiting of seventy-two minutes, then the route calculation module 120 calculates the overall time spent waiting for transportation during the transit route as eighty-four minutes. The route calculation module 120 can calculate the overall time spent waiting for transportation during a transit route using the following equation:

$$\text{TimeWaiting}_{Route} = \sum\limits_{\substack{Portions\ in\\Route}} \text{TimeWaiting}_{Portion} \quad \text{Equation 7}$$

The route calculation module 120 can calculate the overall time spent waiting for transportation during the train, trolley, and bus transit route using the following equation:

Time Waiting$_{Train,\ Trolley,\ and\ Bus\ Route}$=72+12=84 minutes         Equation 8

In some implementations, the time spent waiting for transportation is an estimate of actual time spent waiting for transportation. In addition, the time spent waiting can represent an estimate of a maximum amount of time spent waiting. Alternatively, the time spent waiting can represent an estimate of an average amount of time spent waiting. For example, the transit routing system 102 can divide the maximum amount of time spent waiting by two to estimate an average amount of time spent waiting. In some implementations, the transit routing system 102 can modify a contribution of the time spent waiting to a route planning process by applying a weighting factor to the time spent waiting. For example, the transit routing system 102 can multiply the estimated time spent waiting by a number greater than one or by a fraction to increase or decrease, respectively, the contribution of the time spent waiting to the route planning process.

The transit routing system 102 can, in some implementations, use periods of operation that are specific to each portion of the transit route, and/or to each mode of transportation. For example, the route calculation module 120 can calculate a time spent waiting at a portion of the transit route by first multiplying a first period of operation for a first mode of transportation by a second period of operation for a second mode of transportation. The route calculation module 120 can then divide the result by a sum of the first period of operation multiplied by a first number of trips for the first mode of transportation and the second period of operation multiplied by a second number of trips for the second mode of transportation. In another example, route calculation module 120 can divide the sum of the periods of operation by the sum of the numbers of trips. In yet another example, such as where the periods of operation overlap, the route calculation module 120 can divide the maximum period of operation by the sum of the numbers of trips. The maximum period of operation can be, for example, the maximum of the individual periods of operation where other periods are encompassed within one period, or a maximum range of the periods of operation where periods overlap but not necessarily completely encompassed within one period.

In some implementations, the route calculation module 120 calculates an amount of time spent walking during the transit route. For example, a person may spend ten minutes walking form an initial location to the first transfer station for the commuter train. The person may also spend five minutes walking from the commuter train to the trolley or the bus at the second transfer station. The person may also spend fifteen minutes walking from the third transfer station to a final destination. The route calculation module 120 can calculate the overall time spent walking for a transit route as a sum of the time spent walking for each portion the transit route (e.g., thirty minutes in this example).

While, the examples here describe walking to and from transfer stations a person can use other ways of getting to and from transfer stations, such as one or more of biking, running, inline and roller skating, and riding a vehicle or other conveyance that is not part of the scheduled transportation in the transit system. In some implementations, the transit routing system 102 allows a user to specify (e.g., in the request 108) the way or ways in which the traveler intends to get to and from transfer stations. In response to receiving the specified way or ways of getting to and from the transfer stations, the transit routing system 102 can choose amounts of time for getting to and from the transfer stations that are specific to the specified way or ways of getting to and from the transfer stations.

The route calculation module 120 uses the overall time spent riding and the overall time spent waiting for the transit route to calculate an overall duration of the transit route. In some implementations, the route calculation module 120 calculates the overall duration as the sum of the time spent riding and the time spent waiting during the transit route. For example, the route calculation module 120 can add the overall time spent riding of thirty-three and a third minutes to the overall time spent waiting of eighty-four minutes to calculate an overall duration of one hundred seventeen and a third minutes. In some implementations, the route calculation module 120 also includes the overall time spent walking in the overall duration of the transit route. The route calculation module 120 can calculate the overall duration of a transit route using the following equation:

Duration$_{Route}$=Time Riding$_{Route}$+Time Waiting$_{Route}$+Time Walking$_{Route}$         Equation 9

The route calculation module 120 can calculate the overall duration of the train, trolley, and bus transit route using the following equation:

$$\text{Duration}_{Train,\ Trolley,\ and\ Bus\ Route} = 33\frac{1}{3} + 84 + 30 = 147\frac{1}{3} \text{ minutes} \quad \text{Equation 10}$$

In addition to the train, trolley, and bus transit route described above, the route identification module 118 identifies other transit routes that connect the source location to the destination location. The route calculation module 120 also calculates durations of the other transit routes. Then, a route optimization module 122 identifies one or more transit routes 114 that satisfy one or more conditions for selection of optimal transit routes. In some implementations, the route optimization module 122 can select one or more transit routes that have shortest durations (e.g., five transit routes with the shortest durations). In some implementations, the route optimization module 122 selects one or more transit routes that have both the shortest durations and fewest transfers.

For example, the route optimization module 122 can compare the durations and number of transfers of the transit routes to one another. If a first transit route has fewer transfers and a same or shorter duration than a second transit route, then the route optimization module 122 retains the first transit route as a possible selection instead of the second transit route and continues to compare the first transit route to the other transit routes. If the first transit route has a same number of transfers as the second transit route and the duration of the first transit route is shorter than the duration of the second transit route by at least a threshold amount, then the route optimization module 122 retains the first transit route as a possible selection instead of the second transit route and continues to compare the first transit route to the other transit routes. The threshold can include, for example, a percentage of a duration of a transit route (e.g., the duration of second transit route is at least 115% longer than the duration of the first transit route) and/or a fixed amount (e.g., the duration of second transit route is at least thirty minutes longer than the duration of the first transit route). If neither of the two conditions above is satisfied, then the route optimization module 122 retains both transit routes as possible selections and compares both transit routes to the remaining transit routes.

After the route optimization module 122 identifies the transit routes 114 that satisfy the conditions, the transit routing system 102 can, for example, provide the transit routes 114 to the computing device 104 through the interface 116. The computing device 104 can then present the transit routes 114 to a user using an output device, such as a display screen. In another example, the transit routing system 102 can use the identified time independent transit routes as a set of possible transit routes for identifying time dependent transit routes (e.g., transit routes for a particular departure and/or arrival time). The transit routing system 102 can then provide the time dependent transit routes to the computing device 104 through the interface 116.

In some implementations, the transit routing system 102 receives the data for the transit routes 110 from a system in communication with the network 106 trough the interface 116 and then stores the data for the transit routes 110 in the data storage 112. For example, one or more transit systems may make the data for the transit routes 110 in the transit systems available for download over the network 106.

In some implementations, the transit routing system 102 performs one or more operations in the transit route planning process prior to receiving the request from the computing device 104 for one or more transit routes. For example, the route calculation module 120 can calculate one or more of the individual time spent riding, time spent waiting, and time spent walking for each portion and/or the overall time spent riding, time spent waiting, time spent walking, and duration for each transit route. The transit routing system 102 can then store the pre-calculated information in the data storage 112 and retrieve the pre-calculated information to process the request from the computing device 104. In some implementations, the transit routing system 102 reduces an amount of time spent in responding to the request from the computing device 104 by pre-calculating information for one or more of the transit routes 110.

Figure 2:
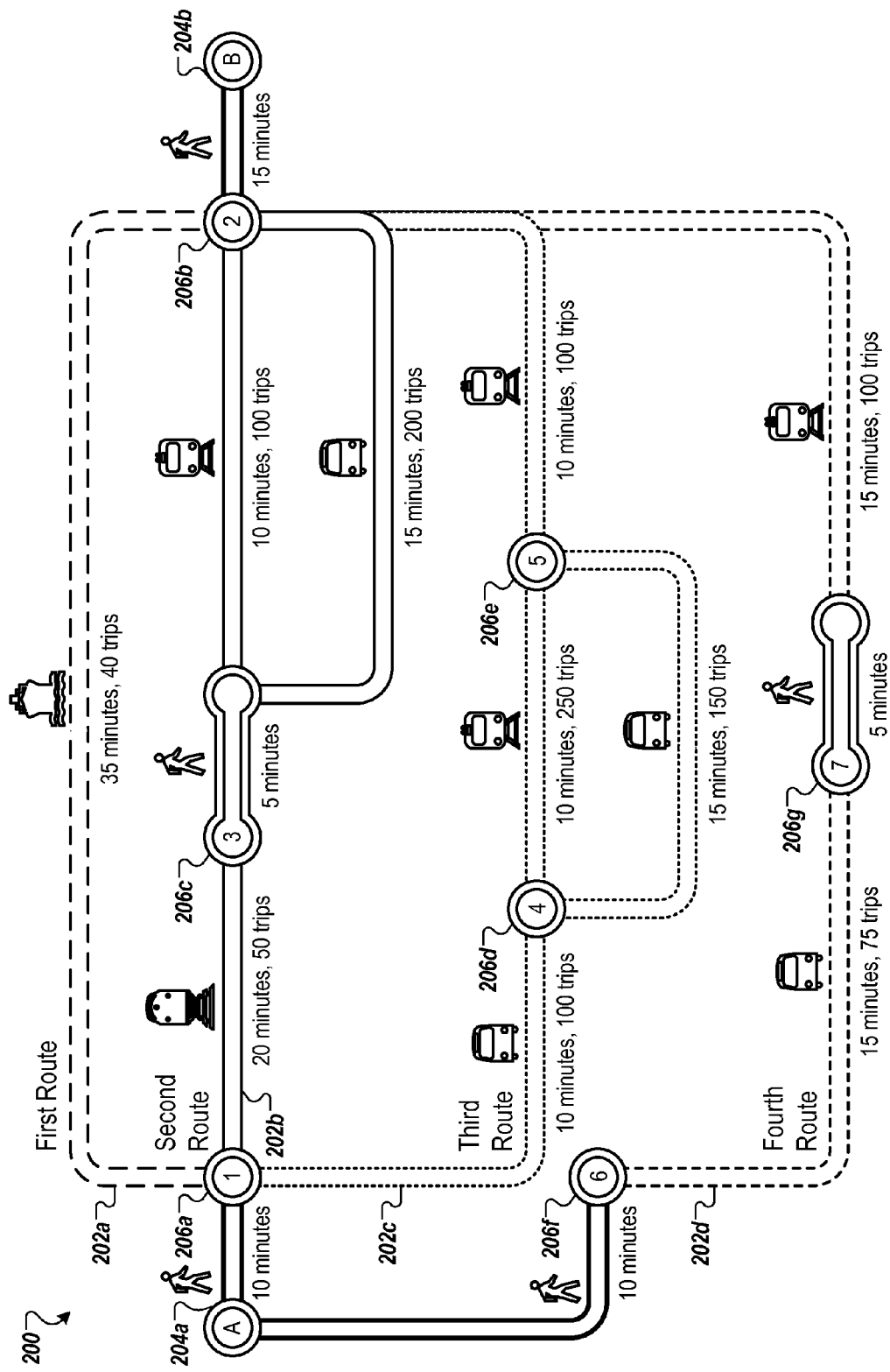
FIG. 2 is a schematic diagram that shows an example of a transit system that includes multiple time independent transit routes.

FIG. 2 is a schematic diagram that shows an example of a transit system 200 that includes multiple time independent transit routes. The time independent transit routes include a first transit route 202a, a second transit route 202b, a third transit route 202c, and a fourth transit route 202d. Each of the first transit route 202a, the second transit route 202b, the third transit route 202c, and the fourth transit route 202d can also include travel that is not part of the transit system 200, such as walking to and from a source location 204a and a destination location 204b. A system, such as the transit routing system 102, identifies the time independent transit routes as possible routes a person can take to get from the source location 204a to the destination location 204b. The transit routing system 102 then evaluates each of the time independent transit routes to identify transit routes that have shortest durations and/or fewest transfers.

The first transit route 202a is a ferry that provides transportation from a first transfer station 206a to a second transfer station 206b. A trip on a ferry for the first transit route 202a takes thirty-five minutes to get from the first transfer station 206a to the second transfer station 206b and one or more ferries make the trip forty times during a period of operation of the ferries (e.g., business hours during a work week). The first transit route 202a also includes walking for ten minutes from the source location 204a to the first transfer station 206a and for fifteen minutes from the second transfer station 206b to the destination location 204b. Accordingly, the transit routing system 102 can calculate an overall duration of the first transit route 202a using the following equation:

$$\text{Duration}_{First\ Route} = \qquad\qquad\qquad\qquad \text{Equation 11}$$
$$35 + \frac{5 \times 12 \times 60}{40} + 10 + 15 = 150 \text{ minutes}$$

The second transit route 202b includes the commuter train, trolley, and bus example described with respect to FIG. 1. The commuter train represents a first portion of the second transit route 202b between the first transfer station 206a and a third transfer station 206c. The trolley and bus represent a second portion of the second transit route 202b between the third transfer station 206c and the second transfer station 206b. The transit routing system 102 can calculate an overall duration of the second transit route 202b of one hundred forty-seven and one third minutes, as shown above in Equation 10.

A first portion of the third transit route 202c includes a bus mode of transportation from the first transfer station 206a to a fourth transfer station 206d that makes one hundred trips that are ten minutes in length during the period of operation of the bus mode. A second portion of the third transit route 202c includes both trolley and bus modes of transportation from the fourth transfer station 206d to a fifth transfer station 206e that make two hundred fifty trips that are ten minutes in length and one hundred fifty trips that are fifteen minutes in length, respectively, during the periods of operation of the trolley and bus modes. A third portion of the third transit route 202c includes a trolley mode of transportation from the fifth transfer station 206e to the second transfer station 206b that makes one hundred trips that are ten minutes in length during the period of operation of the trolley mode. The third transit route 202c also includes walking times of ten minutes to the first transfer station 206a and fifteen minutes to the destination location 204b. Accordingly, the transit routing system 102 can calculate an overall duration of the third transit route 202c using the following equations:

$$\text{Time Riding}_{Third\ Route} = \qquad\qquad\qquad\qquad \text{Equation 12}$$
$$10 + \frac{10 \times 250 + 15 \times 150}{250 + 150} + 10 = 31\frac{7}{8} \text{ minutes}$$

$$\text{Time Waiting}_{Third\ Route} = \qquad\qquad\qquad\qquad \text{Equation 13}$$
$$\frac{5 \times 12 \times 60}{100} + \frac{5 \times 12 \times 60}{250 + 150} + \frac{5 \times 12 \times 60}{100} = 81 \text{ minutes}$$

$$\text{Time Walking}_{Third\ Route} = 10 + 15 = 25 \text{ minutes} \qquad \text{Equation 14}$$

$$\text{Duration}_{Third\ Route} = 31\frac{7}{8} + 81 + 25 = 137\frac{7}{8} \text{ minutes} \qquad \text{Equation 15}$$

A first portion of the fourth transit route 202d includes a bus mode of transportation from a sixth transfer station 206f to a seventh transfer station 206g that makes seventy-five trips that are on average fifteen minutes in length during the period of operation of the bus mode. A second portion of the fourth transit route 202d includes a trolley mode of transportation from the seventh transfer station 206g to the second transfer station 206b that makes one hundred trips that are also on average fifteen minutes in length during the period of operation of the trolley mode. The fourth transit route 202d also includes walking times of ten minutes to the sixth transfer station 206f, five minutes to the seventh transfer station 206g, and fifteen minutes to the destination location 204b. Accordingly, the transit routing system 102 can calculate an overall duration of the fourth transit route 202d using the following equation:

$$\text{Duration}_{Fourth\ Route} = \qquad\qquad\text{Equation 16}$$
$$15 + 15 + \frac{5 \times 12 \times 60}{75} + \frac{5 \times 12 \times 60}{100} + 10 + 5 + 15 =$$
$$144\ \text{minutes}$$

The transit routing system 102 then identifies one or more transit routes that have the shortest durations from among the first transit route 202a, the second transit route 202b, the third transit route 202c, the fourth transit route 202d, and other transit routes (not shown) between the source location 204a and the destination location 204b in the transit system 200. In some implementations, the transit routing system 102 steps through the portions of the transit routes using Dijkstra's algorithm to identify those transit routes that have the shortest durations, such as the transit routes that have the shortest four durations.

For example, the transit routing system 102 can compare the durations of the first transit route 202a, the second transit route 202b, the third transit route 202c, and the fourth transit route 202d to the durations of other transit routes in the transit system 200 that all have durations greater than one hundred fifty minutes (e.g., greater than the largest duration in the first transit route 202a, the second transit route 202b, the third transit route 202c, and the fourth transit route 202d). As a result, the transit routing system 102 identifies the first transit route 202a, the second transit route 202b, the third transit route 202c, and the fourth transit route 202d as having the shortest four durations. Alternatively, the transit routing system 102 can identify a number of transit routes with the shortest durations other than four, such as one, two, or ten.

In some implementations, the transit routing system 102 uses multiple conditions when identifying the best transit routes. For example, the transit routing system 102 can identify one or more transit routes that have a fewest number of transfers in addition to the shortest durations. The transit routing system 102 can apply a first rule identifying a first transit route as more optimal than a second transit route if the duration and number of transfers of the first transit route are both less than the duration and the number of transfers of the second transit route. The transit routing system 102 can apply a second rule identifying a first transit route as more optimal than a second transit route if the numbers of transfers are the same and the duration of the first transit route is less than the duration of the second transit route by a threshold amount, such as a fixed amount (e.g., five, ten, or fifteen minutes less) or a percentage amount (e.g., 5%, 10%, or 15% less).

In some implementations, the transit routing system 102 may identify the transit routes that are not more or less optimal than one another as recommended transit routes and/or as inputs to a time dependent routing algorithm for a specific departure and/or arrival time. For example, a first route may have a shorter duration and a larger number of transfers than a second route. Therefore, according to the two rules, the first route is not more or less optimal than the second route. The transit routing system 102 can then identify both as possible recommended transit routes and/or inputs to a time dependent routing algorithm for a specific departure and/or arrival time.

In the case of the multiple conditions that include transfers and durations, the transit routing system 102 determines that the first transit route 202a has fewer transfers than the second transit route 202b (two versus three). However, the transit routing system 102 also determines that the first transit route 202a has a longer duration than the second transit route 202b (one hundred fifty minutes versus one hundred forty-seven and one third minutes). Therefore, the transit routing system 102 does not determine that the first transit route 202a is more optimal than the second transit route 202b. Accordingly, the transit routing system 102 identifies both the first transit route 202a and the second transit route 202b as candidates for satisfying the fewest transfers and shortest duration conditions (e.g., the set of transit routes with the fewest transfers and shortest durations).

The transit routing system 102 continues to compare the first transit route 202a and the second transit route 202b to other transit routes from the source location 204a to the destination location 204b in the transit system 200. For transit routes that have both more transfers and longer durations than a transit route in the current set of candidate transit routes, the transit routing system 102 does not identify or removes those transit routes having both more transfers and longer durations from consideration for inclusion in the set of candidate transit routes.

The transit routing system 102 adds transit routes to the set of candidate transit routes that are not less or more optimal than the candidate transit routes without removing any candidates. For example, the transit routing system 102 can add the third transit route 202c to the set of candidates in response to determining that the third transit route 202c has a shorter duration (one hundred thirty-seven and seven eighths minutes) than any transit routes in the set of candidates (one hundred fifty, and one hundred forty-seven and one third). However, the transit routing system 102 does not remove any of the existing candidates from the set, because the transit routing system 102 determines that the third transit route 202c has more transfers (four) than any of the candidates (two and three). Therefore, the transit routing system 102 determines that the third transit route 202c is not more optimal than any of the candidate transit routes, but is also not less optimal.

The transit routing system 102 determines that the fourth transit route 202d has a same number of transfers (three) as one of the candidate transit routes (e.g., the second transit route 202b). The transit routing system 102 also determines that the fourth transit route 202d has a shorter duration (one hundred forty-four minutes) than the second transit route 202b (one hundred forty-seven and one third minutes), but not by more than 15% of the duration of the second transit route 202b. Therefore, the transit routing system 102 determines that the neither of the fourth transit route 202d and the second transit route 202b is more optimal than the other is and both are identified as possible candidates.

If the transit routing system 102 determines that another transit route with three transfers has a duration that is more than 15% shorter than either of the fourth transit route 202d and the second transit route 202b, then the transit routing system 102 identifies the other transit route as a candidate and those transit routes with three transfers that are longer by more than 15% are no longer identified as candidates. If the transit routing system 102 determines that another transit route with three transfers has a duration that is more than 15% longer than either of the fourth transit route 202d and the second transit route 202b, then the transit routing system 102 does not identify the other transit route as a candidate and the existing transit routes with three transfers remain as candidates.

The transit routing system 102 can use conditions other than or in addition to one or more of the two conditions described above. For example, the transit routing system 102 can identify a first transit route as more optimal than a second transit route if the first transit route has at least a threshold number of fewer transfers (e.g., three fewer transfers than the second transit route) even though the duration of the second transit route may be shorter than the first transit route. In another example, the transit routing system 102 can identify a first transit route as more optimal than a second transit route if the first transit route has at least a threshold number of fewer transfers (e.g., three fewer transfers than the second transit route) and the duration of the first transit route is no more than 15% longer than the duration of the second transit route. In some implementations, the transit routing system 102 can apply the conditions in a particular order to address an event where a first condition contradicts a second condition.

Figure 3:
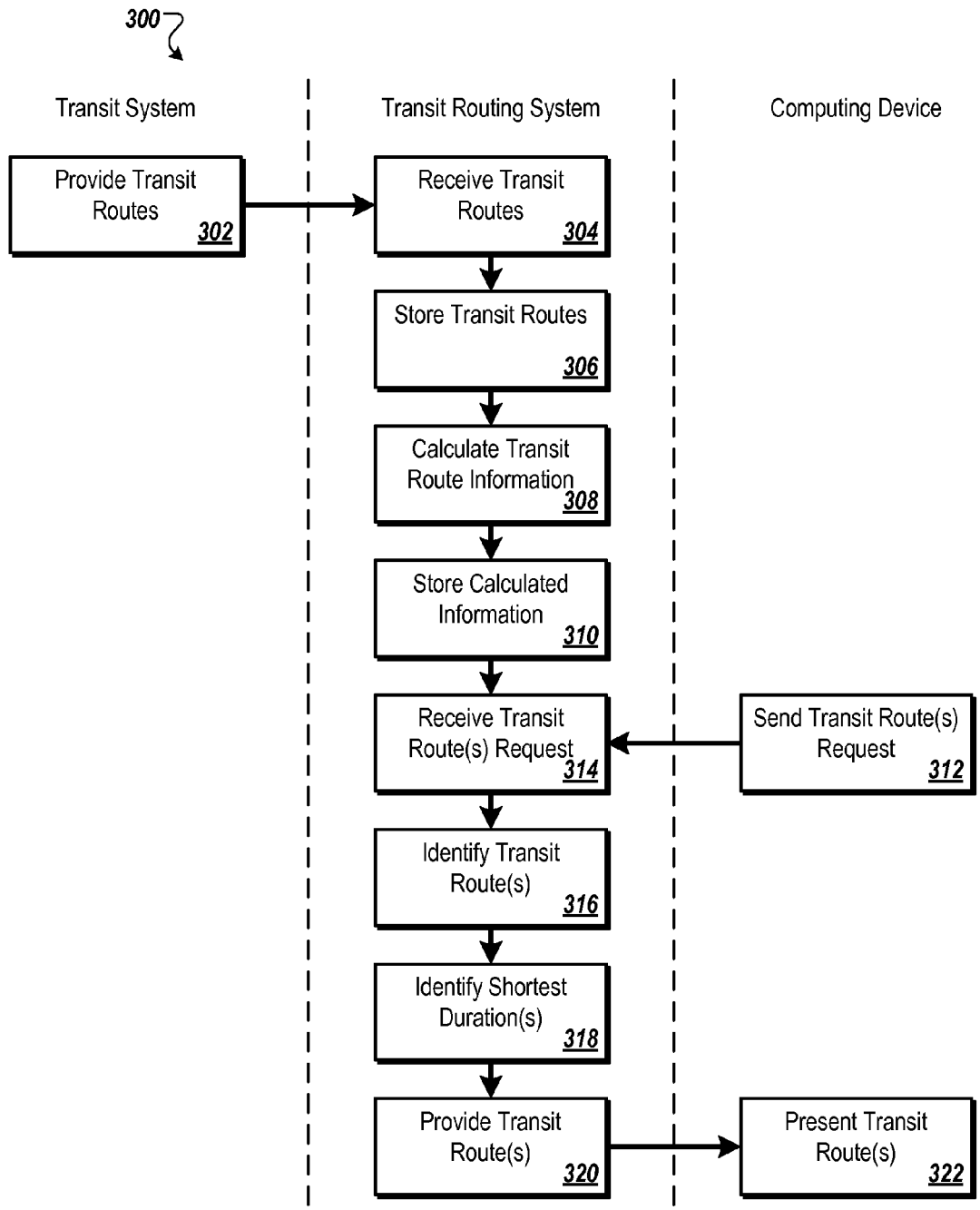
FIG. 3 is flow chart that shows an example of a process for planning a time independent transit route.

FIG. 3 is a flow chart that shows an example of a process 300 for planning a time independent transit route. A system such as the system 100, for example, can perform the process 300. For clarity of presentation, the description that follows uses the system 100 as an example for describing the process 300. However, another system, or combination of systems, may perform the process 300. The process 300 begins with providing (302) transit route information from one or more transit systems to a transit routing system. The transit route information can include, for example, schedules for modes of transportation and locations of transfer stations in the transit systems.

Next, the process 300 receives (304) the transit route information and stores (306) the transit route information. For example, the transit routing system 102 can receive the transit routes 110 from one or more transit systems and store the transit routes 110 in the data storage 112.

The process 300 then calculates (308) additional transit route information using the received transit route information and stores (310) the calculated additional transit route information. The transit routing system 102 can, for example, store the calculated transit route information in the data storage 112.

In some implementations, the transit routing system 102 calculates a period of operation for each mode of transportation in each portion of each transit route based on times and/or days in which trips for the mode of transportation occur with a same or similar frequency. In some implementations, the transit routing system 102 calculates a number of trips per period of operation for each mode of transportation in each portion of each transit route.

In some implementations, the transit routing system 102 calculates one or more of times spent riding, waiting, and getting to transfer stations (e.g., walking) for the transit routes and/or the portions of the transit routes. The transit routing system 102 can base the calculation of the amount of time spent riding transportation on average times spent riding transportation for each portion of the transit route. In some implementations, the transit routing system 102 calculates the time spent riding transportation for each portion of a transit route as a weighted average of the time spent riding for each mode of transportation for the portion, where the weight is based on the number of trips per period of operation for the modes of transportation. The transit routing system 102 can base the calculation the amount of time spent waiting on numbers of trips that transportation have for each portion of the transit route. In some implementations, the transit routing system 102 can base the calculation of the amount of time spent waiting on an amount of time in the period of operation for modes of transportation of each portion of each transit route divided by a sum of the numbers of trips for the modes of transportation of the portion.

In some implementations, the transit routing system 102 calculates an overall duration of each transit route based on one or more of the times spent riding, waiting, and walking for the portions of the transit route. The duration can be representative of an amount of time spent in getting from the start point to the end point using the transit route. The transit routing system 102 can base the calculation of the duration on an amount of time spent riding transportation between transfer stations in the transit route. The transit routing system 102 can further base the calculation of the duration on the amount of time spent waiting for transportation at the transfer stations in the transit route. The transit routing system 102 can further base the calculation of the duration on an amount of time spent getting to and from the transfer stations in the transit route other than riding transportation in the transit system (e.g., walking or biking).

Subsequently, the process 300 sends (312) a request for one or more transit routes from a computing device and the process 300 receives (314) the request at a transit routing system. Information in the request identifies a start point and an end point within one or more transit systems. For example, the computing device 104 can send the request 108 to the transit routing system 102 and the transit routing system 102 can receive the request 108 through the network 106. The request 108 can include information that identifies start and end points, such as the source location 204a and the destination location 204b.

The process 300 identifies (316) transit routes between the start point and the end point. One or more of the transit routes may include at least one transfer between portions of the one or more of the transit routes for different modes of transportation. In addition, one or more of the portions may each have multiple ones of the modes of transportation. For example, the transit routing system 102 can identify a set of possible transit routes between the start point and the end point by retrieving a particular set of transit routes from around the start point and a particular set of transit routes from around the end point and then building a query graph of transit routes that connect the routes around the start point to the routes around the end point. An example of generating the query graph is described in U.S. Patent Application Publication No. 2011/0112759, filed on Apr. 1, 2010, and entitled "Transit Routing System for Public Transportation Trip Planning," the entire contents of which are herein incorporated by reference.

In some implementations, identifying the transit routes is independent of time within a period of operation of each mode of transportation in the transit routes. In some implementations, the numbers of trips that the mode of transportation has for each portion of the transit route is for the period of operation of the mode of transportation.

In some implementations, the process 300 calculates (308) one or more items in the additional transit route information in response to receiving the request for the one or more transit routes. For example, the transit routing system 102 can calculate one or more of the period of operation for each mode of transportation; the number of trips per period of operation for each mode of transportation; the times spent riding, waiting, and walking for the transit routes and/or the portions of the transit routes; and the overall durations of each transit route.

The process 300 identifies (318) one or more of the transit routes that have shortest durations. In some implementations, the process 300 identifies one or more of the transit routes that have a least number of transfers in addition to having the shortest durations. For example, the transit routing system 102 can perform a modified form of Dijkstra's algorithm using multiple conditions (e.g., shortest duration and fewest transfers) to search through a query graph of transit routes to find one or more transit routes having shortest durations between the start point and the end point.

In particular, the transit routing system 102 can include a set of one or more rules that define when one transit route is better or more optimal than another based on a comparison of both the durations and the number of transfers for the transit routes. The set of rules can include, for example, a rule that a first transit route is more optimal than a second transit route if the duration and number of transfers of the first transit route are both less than the duration and the number of transfers of the second transit route. In another example, the set of rules can include a rule that a first transit route is more optimal than a second transit route if the numbers of transfers are the same and the duration of the first transit route is less than the duration of the second transit route by a threshold amount, such as a fixed amount (e.g., five, ten, or fifteen minutes less) or a percentage amount (e.g., 5%, 10%, or 15% less).

The process 300 provides (320) the one or more transit routes that have the shortest durations to a computing device and the computing device presents (322) the one or more of the transit routes that have the shortest durations to a user. For example, the transit routing system 102 can provide the transit routes 114 to the computing device 104, and the computing device 104 can present the transit routes 114 to a user on a display device or other output device.

Figure 4:
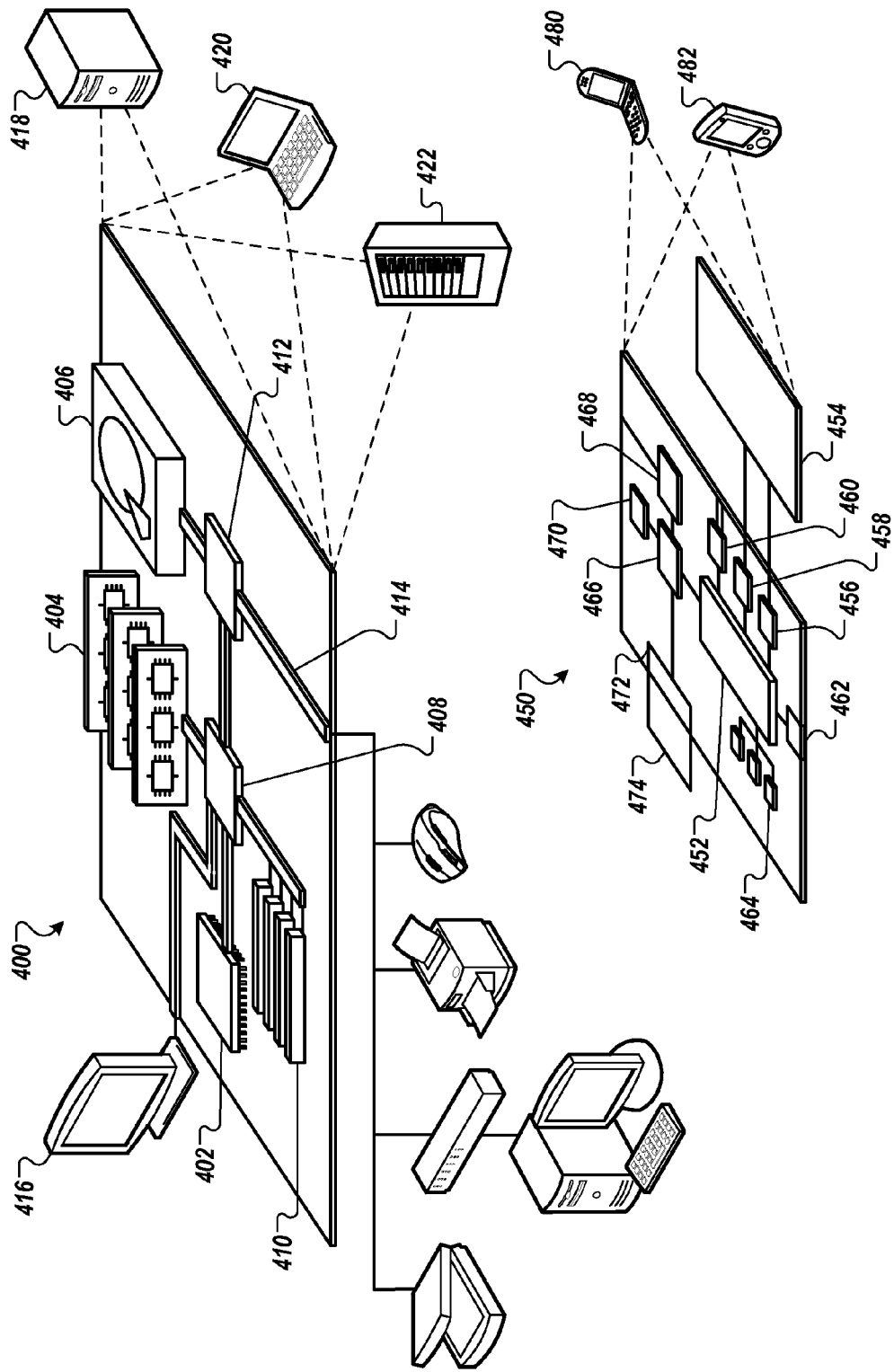
FIG. 4 is a schematic diagram that shows an example of a computing device and a mobile computing device.

FIG. 4 is a schematic diagram that shows an example of a computing device 400 and an example of a mobile computing device that can be used to implement the systems and techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. The memory 464 may include, for example, flash memory and/or NVRAM memory (non-volatile random access memory).

An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for transit route planning, the method comprising:
   receiving information that identifies a start point and an end point in a transit system;
   identifying transit routes between the start point and the end point, wherein each of the transit routes has one or more portions and each of the portions has one or more modes of transportation;
   calculating a duration, within a daily period of operation, for each transit route in the transit routes, wherein the duration is representative of an amount of time spent getting from the start point to the end point using the transit route, wherein the duration is based on average amounts of time spent riding the modes of transportation in the portions of the transit route and an amount of time spent waiting for the modes of transportation in the portions of the transit route, wherein the representation of the amount of time spent waiting is based on numbers of trips that the modes of transportation make for the portions of the transit route for the daily period of operation, and wherein the duration is calculated based on an amount of time spent riding the modes of transportation for the specified portion, an amount of time spent riding a specified mode of transportation in the modes of transportation, and a number of trips by the specified mode of transportation, without accounting for any specific departure or arrival time and date of individual transit routes; and
   identifying, irrespectively of any specific departure or arrival time and date of individual transit routes, an optimal one or more of the transit routes based on the optimal one or more of the transit routes having a shortest duration among the transit routes.

2. The method of claim 1, further comprising providing the one or more of the transit routes that are optimal to a computing device for presentation to a user.

3. The method of claim 2, wherein the numbers of trips that the modes of transportation make are for the daily period of operation of the modes of transportation.

4. The method of claim 3, wherein identifying the one or more of the transit routes that are optimal further comprises identifying one or more of the transit routes that have a least number of transfers in addition to having the shortest durations.

5. The method of claim 4, wherein the representation of the amount of time spent waiting is further based on an amount of time in the daily period of operation of the modes of transportation of each portion of each transit route divided by a sum of the numbers of trips for the modes of transportation of the portion.

6. The method of claim 5, wherein the average amounts of time spent riding the modes of transportation is a weighted average based on the numbers of trips for the modes of transportation.

7. The method of claim 6, wherein the duration for each transit route is further based on an amount of time spent getting to the modes of transportation in the transit route other than while riding the modes of transportation.

8. The method of claim 7, further comprising, prior to receiving the information that identifies the start point and the end point in the transit system, calculating and storing for each transit route in the transit routes one or more of: the duration of the transit route, the amount of time in the daily period of operation of the modes of transportation in the portions of the transit route, the numbers of trips that the modes of transportation make for the portions of the transit route, the average amounts of time spent riding the modes of transportation in the portions of the transit route, and the representations of the amount of time spent waiting for the modes of transportation in the portions of the transit route.

9. A computer-implemented system for transit route planning, the system comprising:
   a memory that stores data representing transit routes in a transit system, wherein each of the transit routes has one or more portions and each of the portions has one or more modes of transportation;
   an interface that receives, from a computing device, data that identifies a start point and an end point in the transit system;
   a route identification module that identifies one or more of the stored transit routes as going from the start point to the end point;
   a route calculation module that calculates a duration, within a daily period of operation, for each transit route in the identified transit routes, wherein the duration is representative of an amount of time spent getting from the start point to the end point using the transit route, wherein the duration is based on average amounts of time spent riding the modes of transportation in the portions of the transit route and a representation of an amount of time spent waiting for the modes of transportation in the portions of the transit route, wherein the representation of the amount of time spent waiting is based on numbers of trips that the modes of transportation make for the portions of the transit route for the daily period of operation, and wherein the duration is calculated based on an amount of time spent riding the modes of transportation for the specified portion, an amount of time spent riding a specified mode of transportation in the modes of transportation, and a number of trips by the specified mode of transportation, without accounting for any specific departure or arrival time and date of individual transit routes; and
   a route optimization module that identifies, irrespectively of any specific departure or arrival time and date of individual transit routes, an optimal one or more of the identified transit routes based on the optimal one or more of the identified transit routes having a shortest duration among the transit routes.

10. The system of claim 9, wherein the route optimization module provides the one or more of the identified transit routes that are optimal to the computing device through the interface.

11. The system of claim 10, wherein the numbers of trips that the modes of transportation make are for the daily period of operation of the modes of transportation.

12. The system of claim 11, wherein the route optimization module further identifies the one or more of the identified transit routes that are optimal based on having a fewest number of transfers.

13. The system of claim 12, wherein the representation of the amount of time spent waiting is further based on an amount of time in the daily period of operation of the modes of transportation of each portion of each transit route divided by a sum of the numbers of trips for the modes of transportation of the portion.

14. The system of claim 13, wherein the average amounts of time spent riding the modes of transportation is a weighted average based on the numbers of trips for the modes of transportation.

15. The system of claim 14, wherein the duration for each transit route is further based on an amount of time spent getting to the modes of transportation in the transit route other than while riding the modes of transportation.

16. The system of claim 15, wherein, prior to receiving the information that identifies the start point and the end point in the transit system, the route calculation module calculates and stores for each transit route in the stored transit routes one or more of: the duration of the transit route, the amount of time in the daily period of operation of the modes of transportation in the portions of the transit route, the numbers of trips that the modes of transportation make for the portions of the transit route, the average amounts of time spent riding the modes of transportation in the portions of the transit route, and the representations of the amount of time spent waiting for the modes of transportation in the portions of the transit route.

17. A computer-readable medium comprising instructions that, when executed by a computer, cause the computer to perform a method for transit route planning, the method comprising:
   receiving information that identifies a start point and an end point in a transit system;
   identifying transit routes between the start point and the end point, wherein each of the transit routes has one or more portions and each of the portions has one or more modes of transportation;
   calculating a duration, within the daily period of operation, for each transit route in the transit routes, wherein the duration is representative of an amount of time spent getting from the start point to the end point using the transit route, wherein the duration is based on a representation of an amount of time spent waiting for and riding the modes of transportation in the portions of the transit route the amount of time spent waiting is based on numbers of trips that the modes of transportation make for the portions of the transit route for the daily period of operation, and wherein the duration is calculated based on an amount of time spent riding the modes of transportation for the specified portion, an amount of time spent riding a specified mode of transportation in the modes of transportation, and a number of trips by the specified mode of transportation, without accounting for any specific departure or arrival time and date of individual transit routes; and
   identifying, irrespectively of any specific departure or arrival time and date of individual transit routes, an optimal one or more of the transit routes based on the optimal one or more of the transit routes having a shortest duration among the transit routes.

18. The computer-readable medium of claim 17, wherein identifying the one or more of the transit routes that are optimal further comprises identifying one or more of the transit routes that have a least number of transfers in addition to having the shortest durations.

19. The computer-readable medium of claim 17, wherein the numbers of trips that the modes of transportation make are for the daily period of operation of the modes of transportation.

20. The computer-readable medium of claim 19, wherein the representation of the amount of time spent waiting is further based on an amount of time in the daily period of operation of the modes of transportation of each portion of each transit route divided by a sum of the numbers of trips for the modes of transportation of the portion.

21. The computer-readable medium of claim 17, wherein the duration is based on average amounts of time spent riding the modes of transportation in the portions of the transit route, and wherein the average amounts of time spent riding the modes of transportation is a weighted average based on the numbers of trips for the modes of transportation.

22. A computer-implemented system for transit route planning, the system comprising:
   a memory that stores data representing transit routes in a transit system, wherein each of the transit routes has one or more portions and each of the portions has one or more modes of transportation;
   an interface that receives, from a computing device, data that identifies a start point and an end point in the transit system;
   a route identification module that identifies one or more of the stored transit routes as going from the start point to the end point;
   a route calculation module that calculates a duration, within a daily period of operation, for each transit route in the identified transit routes, wherein the duration is representative of an amount of time spent getting from the start point to the end point using the transit route, wherein the duration is based on a representation of an amount of time spent waiting for and riding the modes of transportation in the portions of the transit route the amount of time spent waiting is based on numbers of trips that the modes of transportation make for the portions of the transit route for the daily period of operation, and wherein the duration is calculated based on an amount of time spent riding the modes of transportation for the specified portion, an amount of time spent riding a specified mode of transportation in the modes of transportation, and a number of trips by the specified mode of transportation, without accounting for any specific departure or arrival time and date of individual transit routes; and
   a route optimization module that identifies, irrespectively of any specific departure or arrival time and date of individual transit routes, an optimal one or more of the identified transit routes based on the optimal one or more of the identified transit routes having a shortest duration among the transit routes.

23. The system of claim 22, wherein the route optimization module further identifies the one or more of the identified transit routes that are optimal based on having a fewest number of transfers.

24. The system of claim 22, wherein the numbers of trips that the modes of transportation make are for the daily period of operation of the modes of transportation.

25. The system of claim 24, wherein the representation of the amount of time spent waiting is further based on an amount of time in the daily period of operation of the modes of transportation of each portion of each transit route divided by a sum of the numbers of trips for the modes of transportation of the portion.

26. The system of claim 22, wherein the duration is based on average amounts of time spent riding the modes of transportation in the portions of the transit route, and wherein the average amounts of time spent riding the modes of transportation is a weighted average based on the numbers of trips for the modes of transportation.

\* \* \* \* \*